US012618124B2

(12) United States Patent
Barr et al.

(10) Patent No.: US 12,618,124 B2
(45) Date of Patent: May 5, 2026

(54) OXIDATION RESISTANT HIGH CONDUCTIVITY COPPER ALLOYS

(71) Applicant: Honeywell Federal Manufacturing & Technologies, LLC, Kansas City, MO (US)

(72) Inventors: Christian Gentry Miles Barr, Kansas City, MO (US); Timothy Prost, Fremont, CA (US)

(73) Assignees: Honeywell Federal Manufacturing & Technologies, LLC, Kansas City, MO (US); Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 18/066,843

(22) Filed: Dec. 15, 2022

(65) Prior Publication Data

US 2024/0116110 A1 Apr. 11, 2024

Related U.S. Application Data

(60) Provisional application No. 63/413,083, filed on Oct. 4, 2022.

(51) Int. Cl.
B22F 10/28 (2021.01)
B22F 1/052 (2022.01)
(Continued)

(52) U.S. Cl.
CPC .............. C22C 9/00 (2013.01); B22F 10/28 (2021.01); B33Y 70/00 (2014.12); C22C 1/0425 (2013.01);
(Continued)

(58) Field of Classification Search
CPC ........................................ C22C 9/00
See application file for complete search history.

(56) References Cited

U.S. PATENT DOCUMENTS 5,811,187 A 9/1998 Anderson et al.
6,679,955 B2 1/2004 Mino
(Continued)

FOREIGN PATENT DOCUMENTS

CN 1733953 2/2006
CN 1733953 A * 2/2006
(Continued)

OTHER PUBLICATIONS

Ovalle D., et al.; Microstructure development and properties of micro-alloyed copper, Cu-0.3Zr-0.15Ag, produced by electron beam additive manufacturing; J. Materials Characterization; 197; 112675; published Jan. 23, 2023; received Mar. 17, 2022; (Year: 2022).*
(Continued)

*Primary Examiner* — Sally A Merkling
*Assistant Examiner* — Austin Pollock
(74) *Attorney, Agent, or Firm* — HOVEY WILLIAMS LLP

(57) ABSTRACT

A micro-alloyed copper powder was produced using gas atomization reaction synthesis, with the alloy preferably comprising Cu-0.3Zr-0.15Ag wt. %. The novel copper alloy improves the manufacturability of copper in powder bed fusion manufacturing processes by minimizing or avoiding the prior art problems associated with oxidation of the copper precursor used in additive manufacturing. Advantageously, the provided copper alloy powder maintains the high electrical conductivity of copper while addressing the prior art oxidation issue.

9 Claims, 16 Drawing Sheets
(6 of 16 Drawing Sheet(s) Filed in Color)

(51) Int. Cl.

| | |
|---|---|
| *B22F 1/065* | (2022.01) |
| *B22F 1/16* | (2022.01) |
| *B22F 9/08* | (2006.01) |
| *B33Y 10/00* | (2015.01) |
| *B33Y 70/00* | (2020.01) |
| *C22C 1/04* | (2023.01) |
| *C22C 9/00* | (2006.01) |

(52) U.S. Cl.

CPC ................. *B22F 1/065* (2022.01); *B22F 1/16* (2022.01); *B22F 9/08* (2013.01); *B22F 2202/11* (2013.01); *B22F 2301/10* (2013.01); *B22F 2304/10* (2013.01); *B33Y 10/00* (2014.12)

(56) References Cited

U.S. PATENT DOCUMENTS

| | | | |
|---|---|---|---|
| 10,618,854 B2 | 4/2020 | Anderson et al. | |
| 10,781,508 B2 | 9/2020 | Liu et al. | |
| 2007/0068609 A1 | 3/2007 | Saleh | |
| 2017/0189960 A1 | 7/2017 | Ibe | |
| 2017/0305808 A1 | 10/2017 | Anderson et al. | |
| 2018/0133793 A1 | 5/2018 | Heidloff et al. | |
| 2019/0126355 A1 | 5/2019 | Rieken et al. | |
| 2020/0122229 A1 | 4/2020 | Sato et al. | |
| 2021/0214828 A1* | 7/2021 | Böhlke | C22C 9/00 |
| 2021/0291275 A1 | 9/2021 | Stolpe et al. | |
| 2022/0349029 A1 | 11/2022 | Kuse et al. | |
| 2024/0042520 A1* | 2/2024 | Matsumoto | B22F 10/28 |

FOREIGN PATENT DOCUMENTS

| | | | | | |
|---|---|---|---|---|---|
| CN | 104674051 | | 6/2015 | | |
| CN | 104846234 A | * | 8/2015 | | |
| CN | 109112346 A | * | 1/2019 | | B22F 1/0048 |
| CN | 110144489 A | * | 8/2019 | | B22D 11/004 |
| CN | 111394608 A | * | 7/2020 | | |
| CN | 111411255 | | 5/2021 | | |
| JP | 61288036 A | * | 12/1986 | | H01L 23/49579 |
| JP | 09118943 A | * | 5/1997 | | |
| JP | 2010248592 A | * | 11/2010 | | |
| JP | 2011117055 A | * | 6/2011 | | |
| JP | 5320541 B2 | * | 10/2013 | | |
| JP | 2015206075 A | * | 11/2015 | | |
| JP | 2016-053198 | | 4/2016 | | |
| JP | 2021-017639 | | 2/2021 | | |
| WO | WO-2013031841 A1 | * | 3/2013 | | C22C 9/00 |

| | | | | | |
|---|---|---|---|---|---|
| WO | WO-2015152166 A1 | * | 10/2015 | | C22C 9/00 |
| WO | 2017/198127 | | 11/2017 | | |
| WO | 2019/039058 | | 12/2019 | | |
| WO | WO-2019239655 A1 | * | 12/2019 | | B22F 1/00 |
| WO | 2020/016301 | | 1/2020 | | |
| WO | WO-2022052865 A1 | * | 3/2022 | | B22F 9/14 |
| WO | WO-2023162610 A1 | * | 8/2023 | | C22C 9/00 |

OTHER PUBLICATIONS

Li H., et al.; "Influence of Magnetic Field on the Microstructure and Properties of Cu—Ag—Zr Alloy"; Material Science Forum; vol. 817; pp. 460-465; Apr. 10, 2015 (Year: 2015).*

NC State Gradate School; "Oral Examination", retrieved from internet on Apr. 29, 2024; https://grad.ncsu.edu/faculty-and-staff/gsc-resources/oral-examination-information/ (Year: 2024).*

Coddet et al., "On the mechanical and electrical properties of copper-silver and copper-silver-zirconium alloys deposits manufactured by cold spray," Materials Science & Engineering A, 662 (2016) 72-79, 8 pages.

Robinson et al., "Effect of silver addition in copper-silver alloys fabricated by laser powder bed fusion in situ alloying," Journal of Alloys and Compounds, vol. 857, Mar. 15, 2021, 157561, 8 pages. (abstract only attached).

Laser Systems Europe, "3D printable copper-silver alloys developed for heat transfer applications," https://www.lasersystemseurope.com/news/3d-printable-copper-silver-alloys-developed-heat-transfer-applications, printed Jun. 9, 2023, 5 pages.

Machine Translation of CN1733953, 16 pages.

Machine Translation of CN104674051, 5 pages.

Machine Translation of CN111411255, 16 pages.

Machine Translation of JP2016053198, 28 pages.

Jadhav et al., "Surface Modified Copper Alloy Powder for Reliable Laser-based Additive Manufacturing," Additive Manufacturing, vol. 35, Oct. 2020, 101418, 8 pages. (abstract only attached).

Ledford et al., "Characteristics and Processing of Hydrogen-Treated Copper Powders for EB-PBF Additive Manufacturing," Applied Sciences, 9, 2019, 3993, pp. 1-22.

Ledford et al., "Real time monitoring of electron emissions during electron beam powder bed fusion for arbitrary geometries and toolpaths," Additive Manufacturing, vol. 34, Aug. 2020, 101365, 9 pages. (abstract only attached).

Ledford et al., "Evaluation of Electron Beam Powder Bed Fusion Additive Manufacturing of High Purity Copper for Overhang Structures Using In-Situ Real Time Backscatter Electron Monitoring," Procedia Manufacturing, 48, 2020, 828-838, 11 pages.

* cited by examiner

500 μm     Step size = 10 μm

OXIDATION RESISTANT HIGH CONDUCTIVITY COPPER ALLOYS

CROSS-REFERENCE TO RELATED APPLICATIONS

The present application claims the priority benefit of U.S. Provisional Patent Application Ser. No. 63/413,083, filed Oct. 4, 2022, entitled OXIDATION RESISTANT HIGH CONDUCTIVITY COPPER ALLOYS, the entirety of which is incorporated by reference herein.

STATEMENT REGARDING FEDERALLY SPONSORED RESEARCH OR DEVELOPMENT

This invention was made with Government support under Contract No. DE-NA-0002839, awarded by the United States Department of Energy/National Nuclear Security Administration and Contract No. DE-AC02-07CH11358. The Government has certain rights in the invention.

BACKGROUND

Field

The present disclosure relates to copper alloys useful in powder bed fusion additive manufacturing processes.

DESCRIPTION OF RELATED ART

The fabrication of copper components exhibiting high electrical or thermal conductivity using powder bed fusion (PBF) additive manufacturing (AM) presents several distinctive processing challenges. The high thermal conductivity of copper and the comparatively low heat transfer through the powder establishes a narrow process window. Excessive oxidation during normal use and reuse of powder feedstock and its effect on the feasible process window have posed a practical problem for achieving consistent materials properties as well. Pure copper readily forms a non-passivating surface oxide ($Cu_2O$) when exposed to air or moisture. This typically occurs during powder handling, recycling, and/or exposure to the low partial pressures of oxygen present within the build chamber atmosphere during PBF AM. Maintaining a consistent oxygen content throughout the powder production and AM process is complicated by the high specific surface area of the AM powder feedstock as well as the distribution of powder sizes. The thickness of oxide on pure copper powder may only be a few nanometers, but it contributes significantly to the bulk composition. Additionally, significant oxidation of pure copper feedstock powders can occur after several reuse cycles for EB-PBF, and storage of Cu-containing powders in nominal storage conditions can result in a four-fold increase in oxygen content over a 12-month period.

The solubility of oxygen in copper is low and during the processing of copper, a eutectic composition of copper and oxygen solidifies and segregates to the grain boundaries as $Cu_2O$ precipitates. To a limited extent, the thermal and electrical properties of copper are susceptible to degradation caused by the effects of contamination by oxygen. Since the $Cu_2O$ is incoherent, the deleterious effects on thermal and electrical properties are relatively small up to a composition of about 500-600 wt. ppm, however, the influence of oxygen content beyond this range adversely affects the ductility and ultimate tensile strength of PBF AM processed materials and poses a risk for embrittlement if downstream hydrogen brazing processes are required. Further, from the standpoint of process stability and consistency, powder surface oxides can significantly alter the thermo-physical properties of the feedstock and, consequently, the feasible AM process window.

Several alternatives for addressing this challenge have been investigated either directly or indirectly, however, none have been successful in overcoming the above problems.

SUMMARY

The present disclosure is broadly concerned with a copper alloy, structures formed with a copper alloy, and methods of forming a copper alloy powder.

In one embodiment, the copper alloy comprises about 0.26% by weight to about 0.34% by weight Zr and about 0.11% by weight to about 0.19% by weight Ag, with the balance being Cu and optionally incidental impurities. The % by weight is based on the weight of the copper alloy.

In another embodiment, the disclosure provides a three-dimensional structure formed by the additive manufacturing of an alloy comprising Cu, Zr, and Ag.

In yet another embodiment, a method of forming a three-dimensional structure is provided. This method comprises additive manufacturing an alloy comprising Cu, Zr, and Ag.

In a further embodiment, a method of forming a copper alloy powder is provided. The method comprises gas atomizing Cu, Ag, and Zr so as to form the copper alloy powder. The copper alloy powder comprises about 0.26% by weight to about 0.34% by weight Zr and about 0.11% by weight to about 0.19% by weight Ag, with the balance being Cu and optionally incidental impurities. The % by weight is based on the weight of the copper alloy powder.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
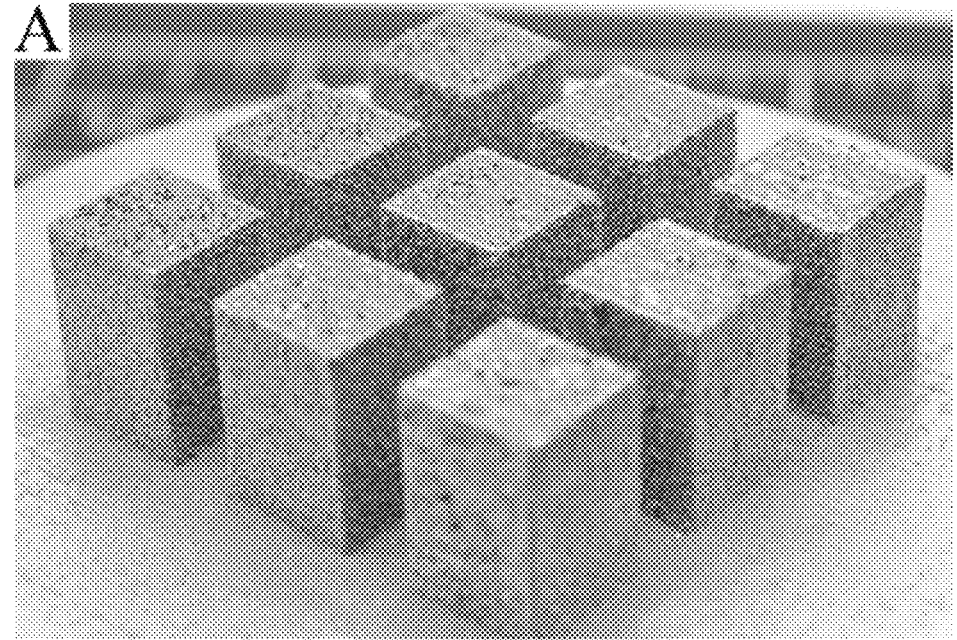
FIG. 1 is a photograph of a typical array of copper alloy samples fabricated by electron beam powder bed fusion, as described in Example 1, Part 3.

The present disclosure is concerned with copper alloys and methods of using those alloys in additive manufacturing.

Copper Alloys

The copper alloys provided herein comprise Zr and Ag. Zr is present in the alloy at levels of about 0.26% by weight to about 0.34% by weight, preferably about 0.28% by weight to about 0.32% by weight, more preferably about 0.28% by weight to about 0.30% by weight, and most preferably about 0.3% by weight, based upon the total weight of the copper alloy taken as 100% by weight.

Ag is present in the alloy at levels of about 0.11% by weight to about 0.19% by weight, preferably about 0.13% by weight to about 0.17% by weight, more preferably about 0.14% by weight to about 0.16% by weight, and most preferably about 0.15% by weight, based upon the total weight of the copper alloy taken as 100% by weight.

The balance of alloy is preferably copper and an incidental impurities. In one embodiment, the copper present in the copper alloy is about 99.47% by weight to about 99.63% by weight, preferably about 99.5% by weight to about 99.6% by weight, more preferably about 99.55% by weight to about 99.6% by weight, and even more preferably about 99.55% by weight, based upon the total weight of the copper alloy taken as 100% by weight.

The most preferred such alloy is Cu-0.3Zr-0.15Ag wt. %.

In another embodiment, it is preferred that any incidental impurities are present at a level of about 0.06% by weight or lower, about 0.04% by weight or lower, about 0.02% by weight or lower, and preferably at about 0.001% by weight or lower, based upon the total weight of the copper alloy taken as 100% by weight. Examples of incidental impurities include Fe, Si, Ti, Y, and/or O.

In most embodiments, the copper alloy will comprise oxygen (in the form of oxides) as a result of oxidation that takes place during storage, processing, and/or handling of copper. The levels of oxygen will vary depending on the conditions encountered, but typical ranges are about 0.01% by weight to about 0.1% by weight, based on the total weight of the copper alloy taken as 100% by weight.

In one embodiment, the alloy consists essentially of Cu, Zr, Ag, and any incidental impurities. In another embodiment, the alloy consists of Cu, Zr, Ag, and any incidental impurities.

In another embodiment, the alloy consists essentially of Cu, Zr, Ag, and oxides. In another embodiment, the alloy consists of Cu, Zr, Ag, and oxides.

The copper alloy can be formed by any conventional alloying process, with gas atomization being one preferred method. One such gas atomization preparation method is described in Example 1, Part 1.

Regardless of how the copper alloy is formed, it is preferably a solid, and more preferably a powder. The powder preferably comprises substantially spherical particles, with an average particle size of about 5 μm to about 106 μm, more preferably about 15 μm to about 63 μm, and even more preferably about 45 μm to about 53 μm.

Additionally or alternatively, the D10-D90 of the particles is about 30 μm to about 100 μm, preferably about 40 μm to about 95 μm, and more preferably about 45 μm to about 89 μm.

Additionally or alternatively, the D50 of the particles is about 40 μm to about 70 μm, preferably about 50 μm to about 65 μm, and more preferably about 55 μm to about 61 μm.

Additionally or alternatively, the particles have a sphericity of about 0.75 to about 1, and preferably about 0.85 to about 1. Sphericity is calculated from cross section or shadowgraph images by:

$$\text{Sphericity} = \frac{4\pi * \text{Area}}{\text{Perimeter}^2}$$

The powder preferably has an average grain size of about 0.1 μm to about 30 μm, more preferably about 0.5 μm to about 25 μm, and even more preferably about 1 μm to about 20 μm. In one embodiment, the powder comprises a plurality of particles, and at least about 80%, preferably at least about 90%, and more preferably at least about 95% of those particles have five or fewer grains.

Methods of Using Copper Alloys

It will be appreciated that the above copper alloy can be used in additive manufacturing processes to form three-dimensional structures. Any additive manufacturing method that uses metal-containing precursors can be used with the disclosed copper alloys, including powder bed fusion, directed energy deposition ("DED"), binder jetting, and metal injection molding ("MIM") additive manufacturing. These powder bed fusion processes include selective laser sintering, selective laser melting, direct metal laser sintering, selective heat sintering, and electron beam melting, with the latter being particular preferred with the disclosed copper alloys. Alternatively, the copper alloy can be processed using traditional powder metallurgy.

Regardless of which process is selected, commercially available equipment can be utilized, following typical processes for that equipment. These methods broadly comprise forming a layer of the alloy powder over a build platform. The layer thickness can vary but in some embodiments will typically be about 20 μm to about 100 μm, preferably about 30 μm to about 80 μm, and more preferably about 40 μm to about 50 μm. The layer is preferably preheated but regardless, energy (typically in the form of radiation) will be selectively contacted with that layer, altering (melting and/or fusing) the portions of the layer that are exposed to that energy. A second layer of the alloy powder is spread across that altered layer, and selective energy application is carried out again. These steps are repeated until the desired three-dimensional structure is created. Post-processing can be carried out to remove the loose powder.

Preferred sources of radiation include electron beams and/or laser beams, with an electron beam being particularly preferred. If an electron beam is utilized, its current is preferably about 6 mA to about 15 mA, more preferably about 8 mA to about 13 mA, and even more preferably about 9 mA to about 12 mA. The beam speed is preferably about 750 mm/s to about 1,250 mm/s, and more preferably about 900 mm/s to about 1,100 mm/s.

Advantageously, the Zr present in the alloy reacts with surface oxides from the alloy during this process. This results in the presence of $ZrO_2$ within the formed three-dimensional structure.

The foregoing results in formed structures with a number of desirable properties. For example, the relative density of the structure will be at least about 97%, preferably at least about 98%, and more preferably at least about 99%.

The electrical conductivity of the formed structure will be at least about 85% IACS, preferably at least about 90% IACS, and more preferably at least about 95% IACS.

The formed structure will have an ultimate tensile strength of at least about 230 MPa, preferably at least about 240 MPa, and even more preferably at least about 260 MPa.

The yield strength of the formed structure will be at least about 130 MPa, preferably at least about 140 MPa, and more preferably at least about 145 MPa.

The % elongation of the formed structure will be at least about 25%, preferably at least about 30%, and more preferably at least about 40%.

In one embodiment, the formed structures have at least two, at least three, at least four, or even all five of the above properties in any combination.

Unless stated otherwise, any properties or characteristics disclosed above can be determined as described in the Examples below.

Additional advantages of the various embodiments will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following Examples set forth methods in accordance with the disclosure. It is to be understood, however, that these examples are provided by way of illustration, and nothing therein should be taken as a limitation upon the overall scope.

Example 1

Materials and Methods

1. Gas Atomization of the Copper Alloy

A final nominal composition of Cu-0.3Zr-0.15Ag wt. %, composed of elemental Cu and Ag (99.99% purity) and Cu—Zr arc-melted master alloy, was melted and homogenized/superheated (about 300° C. above the liquidus) under an inert atmosphere in a 28-kg batch in a pilot-scale gas atomization system at Ames Laboratory-USDOE (Ames, Iowa, USA). At a pouring temperature of about 1420° C., the melt was released by a stopper rod to feed a close-coupled atomization gas die with ~862 kPa (manifold pressure) of argon (UHP grade). The molten metal was disintegrated into fine liquid droplets, which solidified into spherical powders (d50=58 μm) in the controlled process atmosphere of the spray chamber during free flight. Oxygen was chemically bound as a thin powder surface oxide during atomization from an elevated temperature reaction with a downstream "halo" gas flow with a low partial pressure of oxygen (about 1,000 wt. ppm) in an Ar carrier gas, with some minor additional oxidation added during subsequent (glove box) handling and size classification.

The powder was screened in air to a nominal −270/+325 mesh fraction for use in an additive manufacturing process. Approximately 6 kg of powder was produced in this size fraction. Half of the screened powder was stored in a glovebox with flowing inert nitrogen gas maintaining the oxygen level below 10 wt. ppm (hereinafter referred to as the "as-received powder"). The other half was allowed to oxidize in air, under ambient conditions for a period of 1 year following the methodology of Jadhav et al., Surface Modified Copper Alloy Powder for Reliable Laser-based Additive Manufacturing, Additive Manufacturing. 35 (2020) 101418, incorporated by reference herein. Following this methodology emulated the oxygen content resulting from low-temperature exposure or routine handling of powder feedstocks (hereinafter referred to as the "oxidized powder").

2. Powder Feedstock Characterization

Powder feedstock composition was measured with inductively coupled plasma-mass spectroscopy (ICP-MS) for primary elements and inert gas fusion for oxygen (on a LECO OH836). Table 1 shows that the ICP-MS composition of the starting feedstock contains 0.28 wt. % Zr and 0.14 wt. % Ag with trace amounts of residual elements. The oxygen content of the powder ranged from 115 wt. ppm for the as-received powder and to 476 wt. ppm for the powder that was allowed to oxidize. The powder size distribution (PSD) was measured with laser diffraction (Microtrac S3500 in wet mode and ultrasonic agitation). Powder and solid samples were characterized for phase identification using X-Ray Diffraction (XRD) on a PANalytical Empyrean and Rigaku Smartlab diffractometer at room temperature. A JOEL 6010-LA scanning electron microscope (SEM) was used to observe the morphology of the powder, and a Hitachi Ar Blade 5000 ion mill was used to cross-section powder particles for microstructure observations. Transmission electron microscopy (TEM) lift-outs were performed on an FEI Quanta field emission gun (FEG) with a focused ion beam (FIB), and imaging was performed using both secondary electron and Ga-ion channeling contrast. High magnification STEM and TEM imaging was performed on a ThermoFisher Talos F200X equipped with Energy-dispersive X-ray spectroscopy (EDS).

TABLE 1

Chemical composition of starting powder feedstock

| | | | Element | | | | |
|---|---|---|---|---|---|---|---|
| Cu | Zr | Ag | Fe | Si | Ti | Y | O |
| Bal. | 0.28 | 0.14 | <0.001 | <0.005 | <0.001 | 0.001 | 0.0115-0.0423 |

Content (wt. %)

3. Sample Fabrication

It was hypothesized that the low alloying content of the powder used in this study would have a negligible influence on the process parameters compared to those previously used for pure copper. To confirm this, eighteen metallographic analysis samples, measuring 10 mm×10 mm×15 mm of each powder type (i.e., as-received and oxidized powder types) were fabricated using a modified Arcam A2 (software version 3.2 SP2) as described by Ledford et al., Characteristics and Processing of Hydrogen-Treated Copper Powders for EB-PBF Additive Manufacturing, Applied Sciences. 9 (2019) 1-22, and by Ledford et al., Real Time Monitoring of Electron Emissions during Electron Beam Powder Bed Fusion for Arbitrary Geometries and Toolpaths, Additive Manufacturing. (2020) 101365, each incorporated by reference herein. These samples were fabricated on an 88-mm diameter and 35-mm thick oxygen-free copper substrate in rectilinear arrays of 9 samples per run. A photograph showing a representative nine cube build is shown in FIG. 1.

A type K thermocouple was attached to the bottom of the build substrate and was used for monitoring the temperature over the course of the build. Prior to melting the first layer, the copper base plate was heated to 300° C. and maintained at 300° C.±20° C. during the course of the build. The powder was spread across the build substrate with a z-step (nominal layer thickness) of 40 μm. The entire powder bed area was preheated using a defocused raster pattern typical of EB-PBF and then each sample was melted one by one with a sharp focused beam. The raster direction was rotated by 90° for each layer. Each build utilized the Arcam EB-PBF automatic melt mode, which regulates the beam current and speed during each process step to maintain both a constant predicted surface temperature and melt pool size. The precise parameters used in the control software for the preheating step and melt step of each layer are shown in Tables 2 and 3, respectively.

TABLE 2

EB-PBF layer preheating parameters used in this study (Parameters shown below are modified from the commercial parameter sets for Ti6Al4V, V3.2 SP2).

| Parameter | Value |
|---|---|
| Focus Value (mA) | 70 |
| Focus Value Heater (mA) | 150 |
| Box Enable | TRUE |
| Box Size (mm) | 80 |
| Offset to Part (mm) | 0.1 |
| Max Current for Box (mA) | 22.5 |
| Jump Safe Sweep Max Current (mA) | 14 |
| Jump Safe Sweep Min Current (mA) | 0.1 |
| Jump Safe Sweep Speed (mm/s) | 13000 |
| Jump Safe Sweep Total Repetitions of Sweep | 50 |
| Jump Safe Sweep Max Number of Sweeps | 50 |

TABLE 2-continued

EB-PBF layer preheating parameters used in this study (Parameters shown below are modified from the commercial parameter sets for Ti6Al4V, V3.2 SP2).

| Parameter | Value |
|---|---|
| Heating Enable | TRUE |
| Max Heat Time (s) | 5 |
| Heating Between Models | TRUE |

TABLE 3

EB-PBF melt parameters used in this study (Parameters shown below are modified from the commercial parameter sets for Ti6Al4V, V3.2 SP2).

| Melting Parameter | Value |
|---|---|
| Surface Temp (° C.) | 600 |
| Power Analyze Max Current (mA) | 25 |
| Power Analyze Min Current (mA) | 6, 9*, 12* |
| Beam Speed (mm/s) | 1000 |

TABLE 3-continued

EB-PBF melt parameters used in this study (Parameters
shown below are modified from the commercial
parameter sets for Ti6Al4V, V3.2 SP2).

| Melting Parameter | Value |
|---|---|
| Beam Current (mA) | 6, 9*, 12* |
| Max Current (mA) | 6, 9*, 12* |
| Focus Offset (mA) | 18* |
| Speed Function | 20, 25*, 30* |
| Line Offset (mm) | 0.11 |
| Change for Each Depth (mm) | 0.04* |
| Heating Enable | FALSE |

*Parameters used for fabrication of two 60 mm long × 12 mm wide × 28 mm high blocks (described below).

A custom backscatter electron detector mounted inside the electron beam vacuum chamber, concentric to and directly below the beam column was used to measure the normalized intensity of the electron emissions during melting, or the total electron yield (TEY). This method facilitates the measurement of sample density and observation of defects during fabrication. Beam speed and current for each sample and layer were acquired during the melting steps from the X and Y deflection coil feed-back current signal and the high voltage beam current feedback signal at 100 kHz using a National Instrument NI9223 DAQ as described by Ledford et al., Real Time Monitoring of Electron Emissions during Electron Beam Powder Bed Fusion for Arbitrary Geometries and Toolpaths, Additive Manufacturing. (2020) 101365, and Ledford et al., valuation of Electron Beam Powder Bed Fusion Additive Manufacturing of High Purity Copper for Overhang Structures Using In-Situ Real Time Backscatter Electron Monitoring, Procedia Manufacturing. 48 (2020) 828-838, each incorporated by reference herein.

Figure 2:
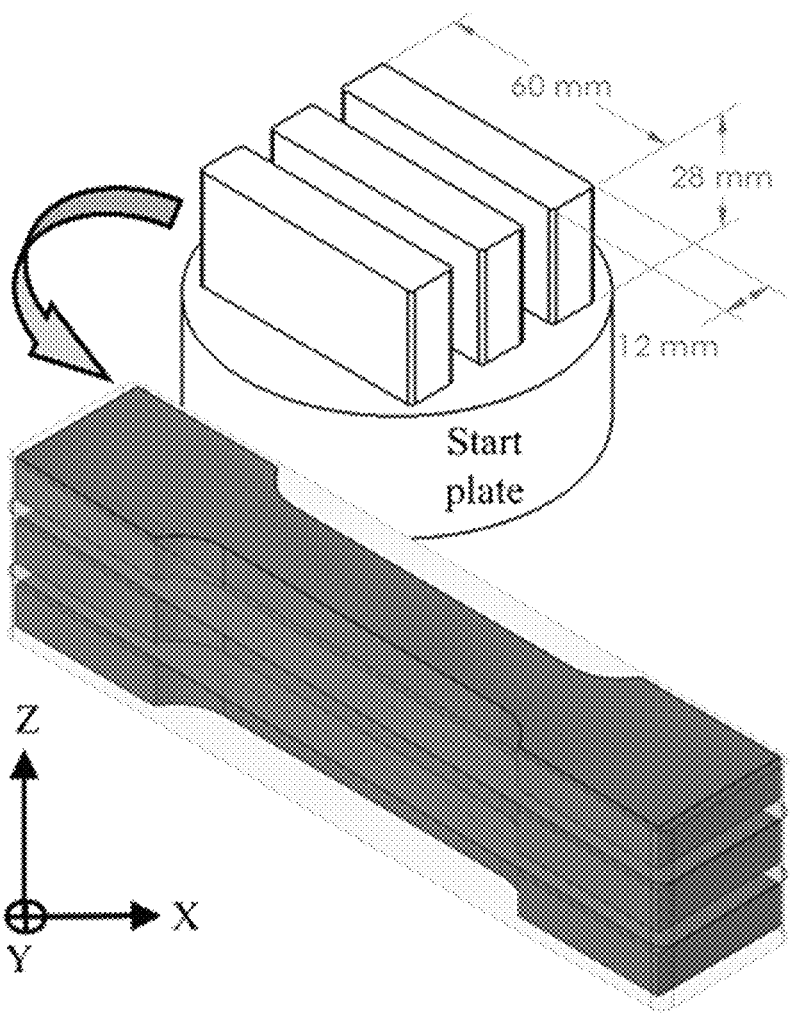
FIG. 2 is a schematic depiction of the layout of blocks on the start plate and tensile sample extraction, as described in Example 1, Part 3.
Figure 3:
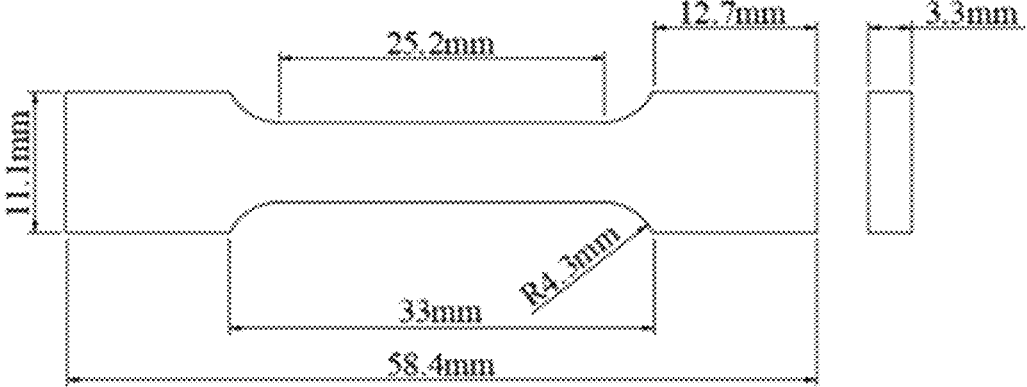
FIG. 3 is a schematic depiction of ASTM Standard sub-size tensile specimens created as described in Example 1, Part 3.
Figure 4:
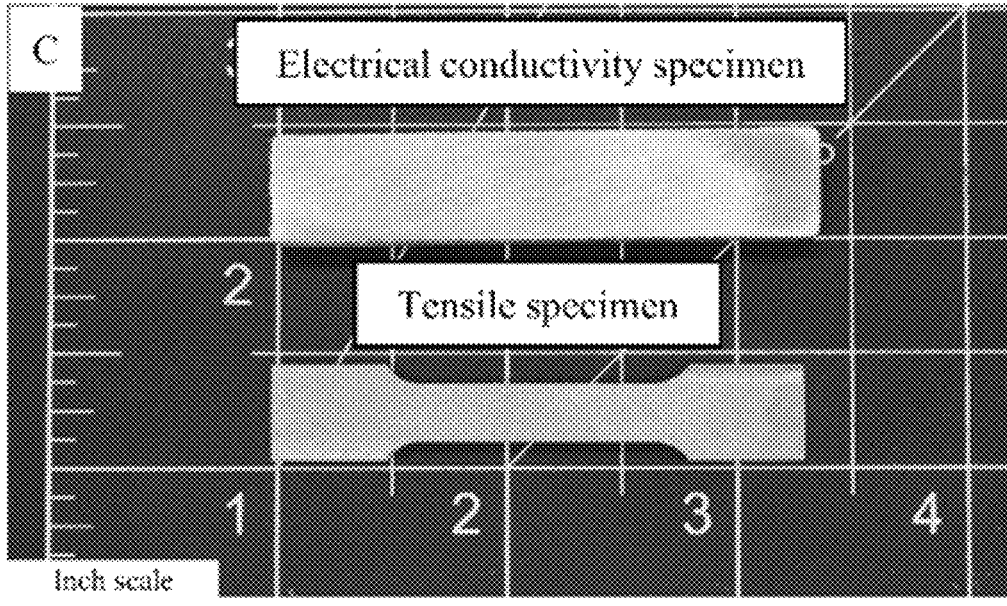
FIG. 4 is a photograph of representative samples created for electrical conductivity and tensile testing, as described in Example 1, Part 3.

From the results of the TEY mapping and selected metallographic inspection, a parameter set (annotated by an asterisk* in Table 3) was identified for the fabrication of two 60 mm long×12 mm wide×28 mm high blocks from which sub-size tensile specimens were harvested. Given the limited quantity of powder, only horizontal specimens were produced. The samples were arranged on the build substrate as shown in FIG. 2 and rotated about the Z axis by 45° for a constant scan line length within the gauge region of the samples. The blocks were removed from the substrate and sliced into 3.5 mm thick samples using wire electric discharge machining (EDM). Rectangular samples harvested from the blocks were used for resistivity measurements and were subsequently machined with EDM to produce sub-size tensile specimens conforming to ASTM E8/E8M-21 (see FIGS. 3-4). A total of six specimens were produced for each test and each powder condition. Prior to testing, the surfaces of each sample were manually wet ground using 400 grit SiC paper on a lapping stone to remove the recast layer from the EDM. Oxygen-free copper bar stock was procured from a commercial source, vacuum annealed for 9 hours at 950° C., and EDM cut in the same way as a control for the electrical conductivity measurements and tensile test.

4. Solid Characterization

Metallographic analysis was carried out on the small prismatic specimens. Once removed from the substrate by EDM, each sample was sectioned longitudinally by a low-speed diamond saw. These were hot mounted in a mixture of conductive graphite powder filler (Pace Technologies CON-DUCTO-1P) and phenolic resin (Mark V MPR-25) and progressively ground from 240 grit to 1200 grit wet SiC paper, and then progressively polished to 3 μm, 1 μm, and 0.05 μm alumina. A Keyence VKx1100 optical microscope was used to capture tiled images at 110× magnification. These were thresholded at a grayscale value of 110 after 8-bit binarization of each micrograph for the measurement of optical density. Vickers microhardness was obtained in a LECO M400 hardness tester under 100 gf with a dwell time of 10 seconds. Mounted samples were indented 10 times parallel to the build direction with a separation of 200 microns. Grain structure was revealed for optical microscopy by etching with ammonium persulfate solution immersed for seconds. Phase identification by XRD and microstructural characterization was performed on SEM and TEM/STEM as described in Part 2 of this Example 1. Electron Back Scatter Diffraction (EBSD) was carried out on a 2 mm×2 mm region of a dense prismatic specimen using the FEI Quanta FEG.

5. Tensile Testing and Electrical Conductivity

Tensile testing was carried out using an ATS 1620C universal testing machine with a constant crosshead speed of 0.4572 mm/min with wedge grips. The reduced area of the dog-bone samples was painted with a uniform white layer as background and black speckles. During the test, images were acquired at 30 frames per minute using a 12.3 MP FLIR Grasshopper camera. 2D Digital Image Correlation (DIC) analysis was performed on the captured images using the software GOM Correlate to calculate the strain and to obtain strain field maps. The 0.2% yield stress was calculated using the linear section of the stress-strain curve.

The electrical conductivity as a percentage of International Annealed Copper Standard (IACS) was calculated from the sample geometry (measured with micrometers to the nearest 50 μm), and the resistance was determined by the four-probe method according to ASTM B193-20, with the exception of the size of the test specimen (see Part 3 of this Example 1). The test was carried out by passing an AC current of ±50 mA through the sample using a KEITHLEY 6221 low noise precision AC/DC current source and measuring the resulting voltage drop (using a KEITHLEY 2182A nano-voltmeter) across the gap between the two middle probes, which were spaced 11.1 mm apart.

Example 2

Results and Discussion

1. Powder Feedstock Characteristics

Figure 5:
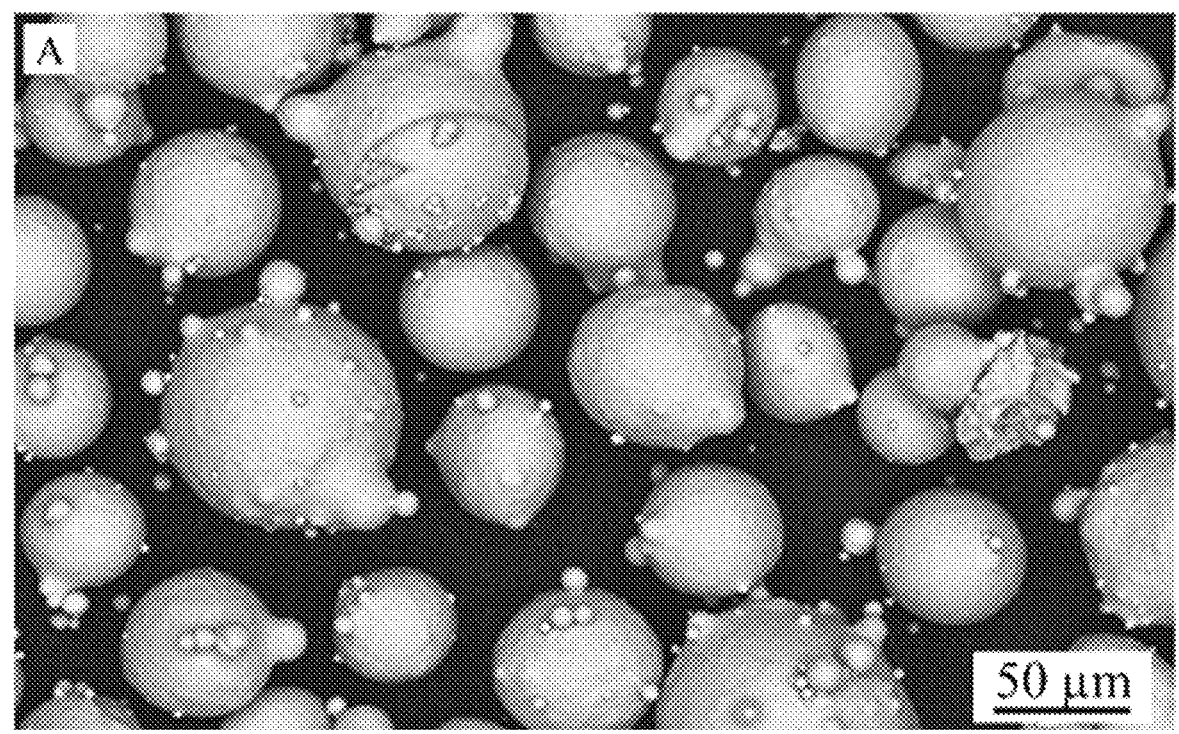
FIG. 5 is a scanning electron microscope (SEM) photograph (300×) of the powder particle morphology of feedstock copper alloy powder (see Example 2, Part 1)
Figure 6:
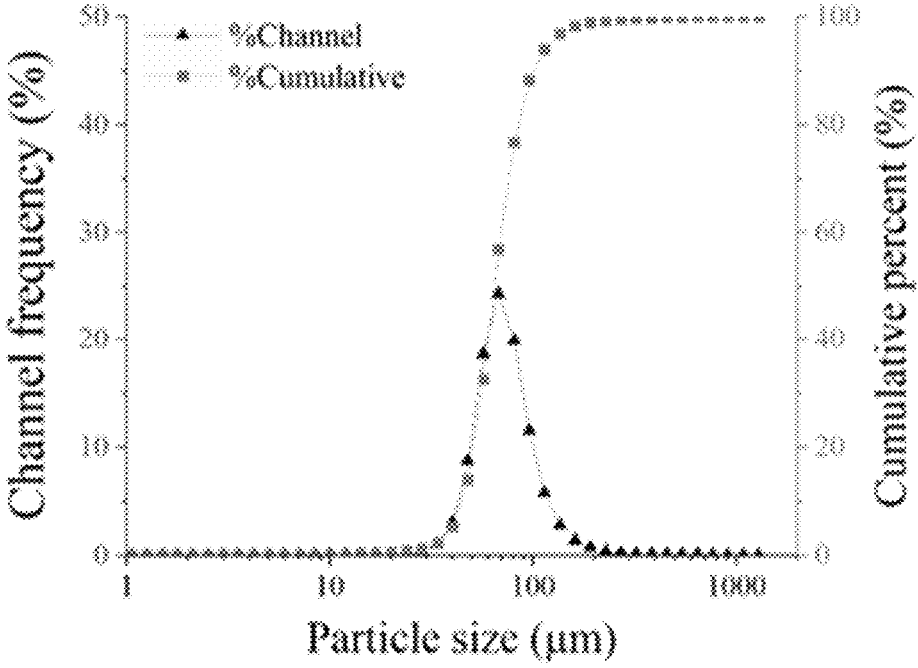
FIG. 6 is a graph of the volumetric powder size distribution of feedstock copper alloy powder (see Example 2, Part 1)

FIG. 5 shows an SEM image that illustrates the representative powder particle morphologies of the copper alloy powder used in this study, and FIG. 6 shows the volumetric powder size distribution plot as measured by laser diffraction. The powder was typically spherical with a mix of satellites, ovals, accretion, and ligament particles, which are shapes common for gas-atomized powder used in additive manufacturing for copper and a number of common alloy systems. The oxygen content of the as-received powder was measured at 115 wt. ppm, and the powder that was allowed to oxidize was measured at 476 wt. ppm, which is in agreement with the range of oxygen reported in the literature from 50-2000 ppm, with the most common range at 100-600 wt. ppm for alloyed and unalloyed copper. The powder size distribution plotted in FIG. 6 demonstrates that the d10-d90 ranged from 45-89 μm, with a d50 at 61 μm, slightly lower than typical EB-PBF size distribution (45-105 μm). These variations in size and morphologies provided no apparent detrimental effects during bed formation and sample solid sample fabrication.

Figure 7:
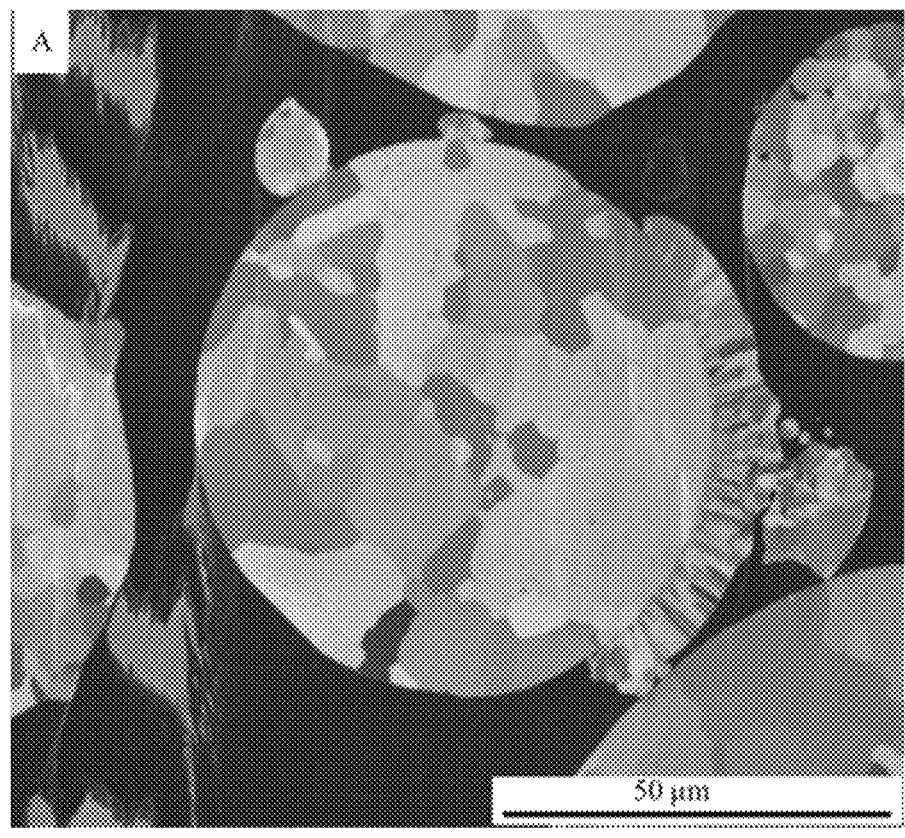
FIG. 7 is gallium ion image of cross-sectioned powder particles showing the general morphology of the particles (Example 2, Part 1)
Figure 8:
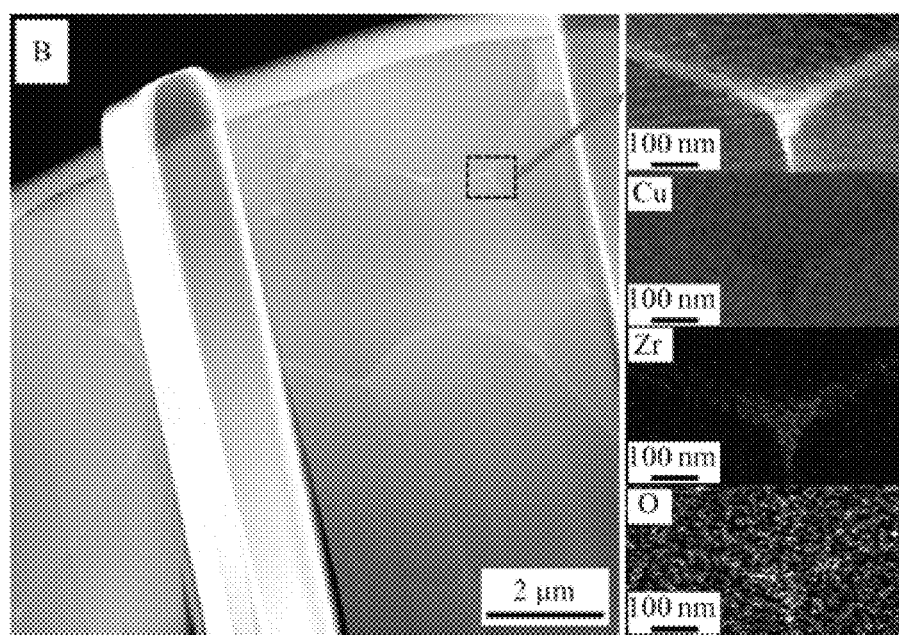
FIG. 8 is an energy-dispersive X-ray spectroscopy map of a powder particle lift-out, showing grain boundary phases (Example 2, Part 1)

Representative powder particles were then ion mill cross-sectioned to reveal internal structures. Gallium ion imaging of the powder cross-sections, which is shown in FIG. 7, demonstrated isotropic grain sizes in the range of 1-20 microns in primary particles, depending on the individual powder particle sizes analyzed. Most of the small particles were observed to contain a few grains (generally <5). The interiors of the powder particles were observed to contain discrete grain boundary films of predominately containing zirconium, as seen in FIG. 8.

FIB lift-outs were extracted from the powder particles and viewed in STEM and TEM for fine feature observation. The TEM images shown in FIG. 8 exhibit features that were consistent with the cross-sectioned particles and reveal mostly elemental Zr films at the grain boundaries with limited other areas which contain trace amounts of oxides. The low magnification ceta camera image in FIG. 8 clearly illustrates a grain boundary film. The set of images in FIG. 8 reveals a number of grain boundaries rich in elemental zirconium, especially at triple points, as evident by the EDS maps with trace amounts of copper or oxygen detected by EDS. A continuous oxygen layer was not observed at the particle surfaces due most likely to the relatively low $O_2$ contents of the powders examined here, in comparison to situations where higher oxygen content powders where sporadic, discrete Cu, and oxygen-rich phases have been observed.

Figure 9:
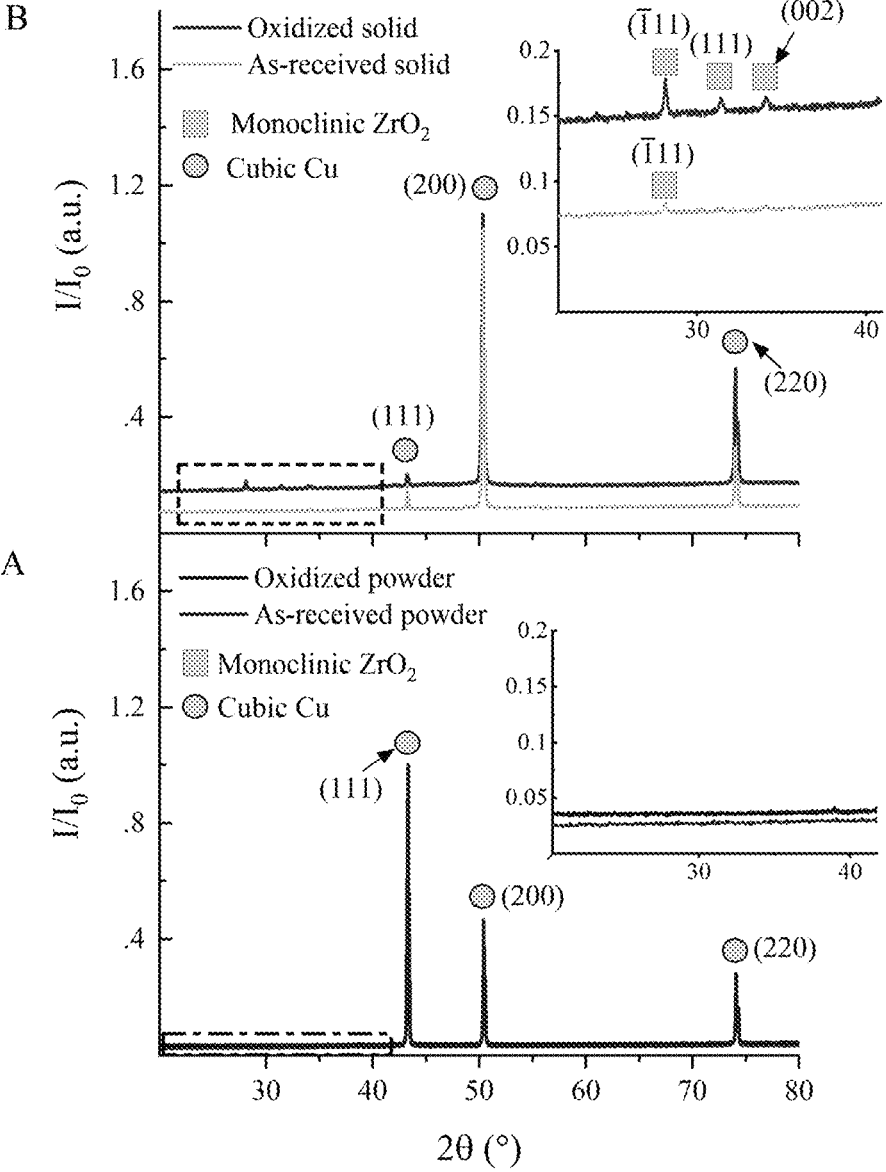
FIG. 9 provides graphs of as-received and oxidized powder (lower portion) and subsequently fabricated solid (upper portion) showing peaks at (111), (200), (220) for powder, and (200), (220) for the solid within a 2θ angle of 20-80 degrees, with insets showing zoomed-in XRD profiles of both powder and solids within a 2θ angle of 20-40 degrees (Example 2, Part 1)

X-Ray diffraction was used to analyze the copper alloy before and after sample fabrication. The bottom curves in FIG. 9 (designated as "A") show XRD spectra of powders in the as-received and oxidized conditions from $2\theta$ of 20-80 degrees, and the upper curves in FIG. 9 (designated as "B") are those for fabricated solids with different oxygen content feedstock. The inset curves have reduced $I/I_0$ values and $2\theta$ of 20-40 degrees, focusing on the small peaks in the beginning portions of the XRD scans where the main peaks of expected phases are located. Both powder curves show standard peak locations and intensity ratios for copper. Also, no other signals were present except for the trace peak at 39.5° $2\theta$ for the oxidized powder, indicating the expected $Cu_9Zr_2$ intermetallic is sufficiently trace to not be readily resolved from the measured background. The solids, however, show very different spectra in comparison to powder. The expected main (111) peak in the solids had significantly reduced intensity which give way to the (200) peak that dominates the spectra in FIG. 9(B), indicating crystallographic anisotropy in the fabricated solids. Also, the inset curves in FIG. 9(B) show the presence of monoclinic zirconia as the second phase determined by Rietveld fitting using HighScore Plus (Malvern Instruments). While the three main peaks for zirconia are resolvable in the solids produced from the as-received and oxidized powder, the latter had a higher relative intensity indicating that the extra oxygen in the powder may have fueled more of the zirconium and oxygen reaction.

The XRD results of the solid show that the zirconium disassociates the oxygen present on the surface of the powder to form more energetically favorable $ZrO_2$. The lack of $ZrO_2$ or $Cu_2O$ peaks in the powder XRD confirms the lack of significant oxides of Zr or Cu, further confirming that the Zr deoxidizes the melt and forms $ZrO_2$ in the fabricated solid articles.

2. Sample Characterization

Figure 10A:
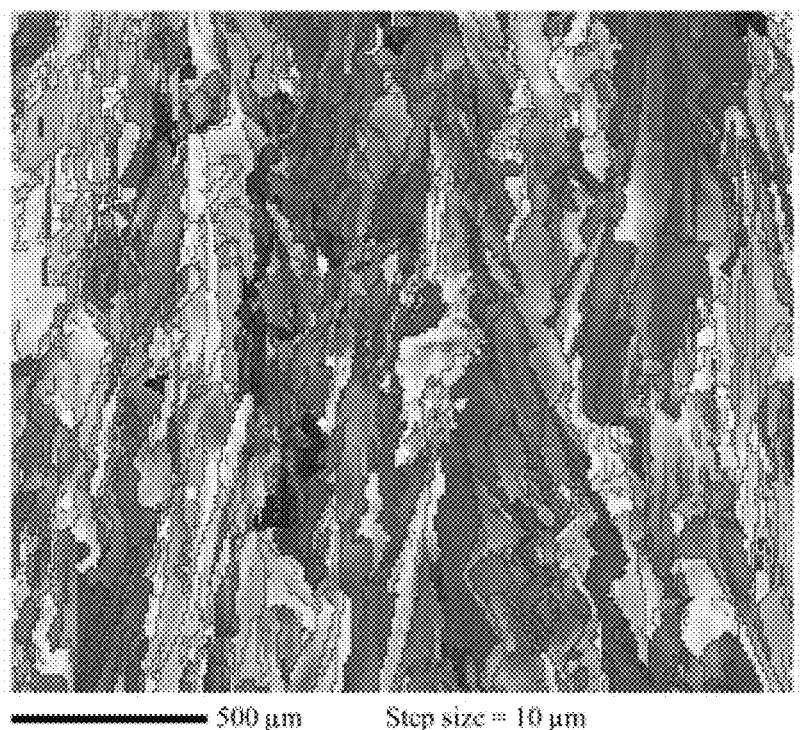
FIG. 10A is an inverse pole figure map as described in Example 2, Part 2.
Figure 10B:
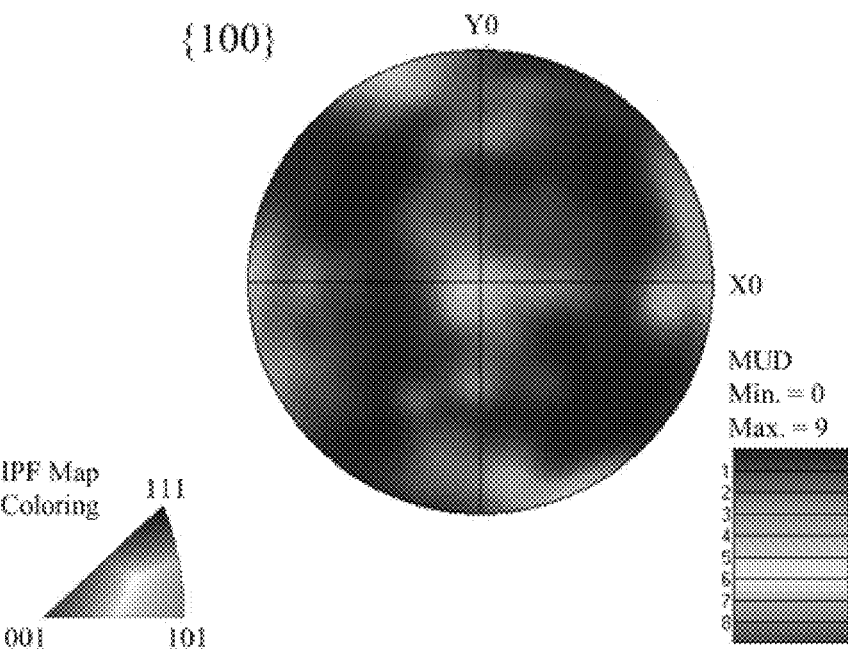
FIG. 10B shows the pole figure data as described in Example 2, Part 2.

Electron backscatter diffraction (EBSD) was used to determine any crystallographic texture inferred from the XRD data in FIG. 9B. The reconstructed inverse pole figure map in FIG. 10A shows a representative sample sectioned along the build direction with anisotropy in and limited amount in the as identified by the predominantly red and green colors in the color map. FIG. 10B is in further agreement using the pole figure data in the {100} projection plane, which shows texture mainly in the <100> family of directions, also complementing trends observed in the XRD data.

Figure 11:
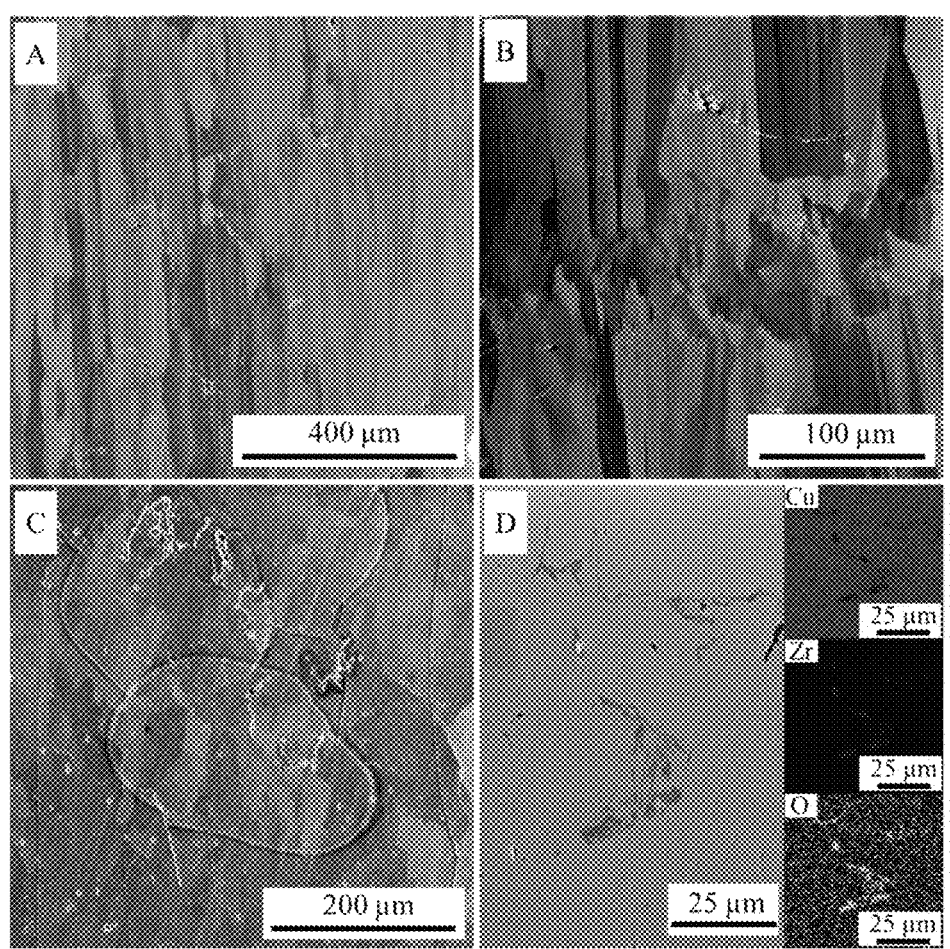
FIG. 11 provides four SEM images of stringer morphologies in Z-direction imaged in gallium ion contrast (A and B), etched surface perpendicular to the beam in backscatter mode (C), and EDS maps (D)

FIGS. 11(A)-(D) show SEM and Ga-ion channeling contrast images of the metallurgical structures within solid samples fabricated in the dense region of the power map, showing epitaxial grains, as observed in the EBSD map in FIG. 10A. Zirconium-oxide rich features were observed and identified by the accompanying EDS maps in FIG. 11(D). Discrete oxide particles were observed; however, elongated stringer-like structures were more commonly present with lengths between 10-50 μm, widths at 5-10 microns, and malformed morphologies that stretched across melt pools, grain boundaries, and other localized solidification structures as illustrated in FIG. 11(C).

Figure 12:
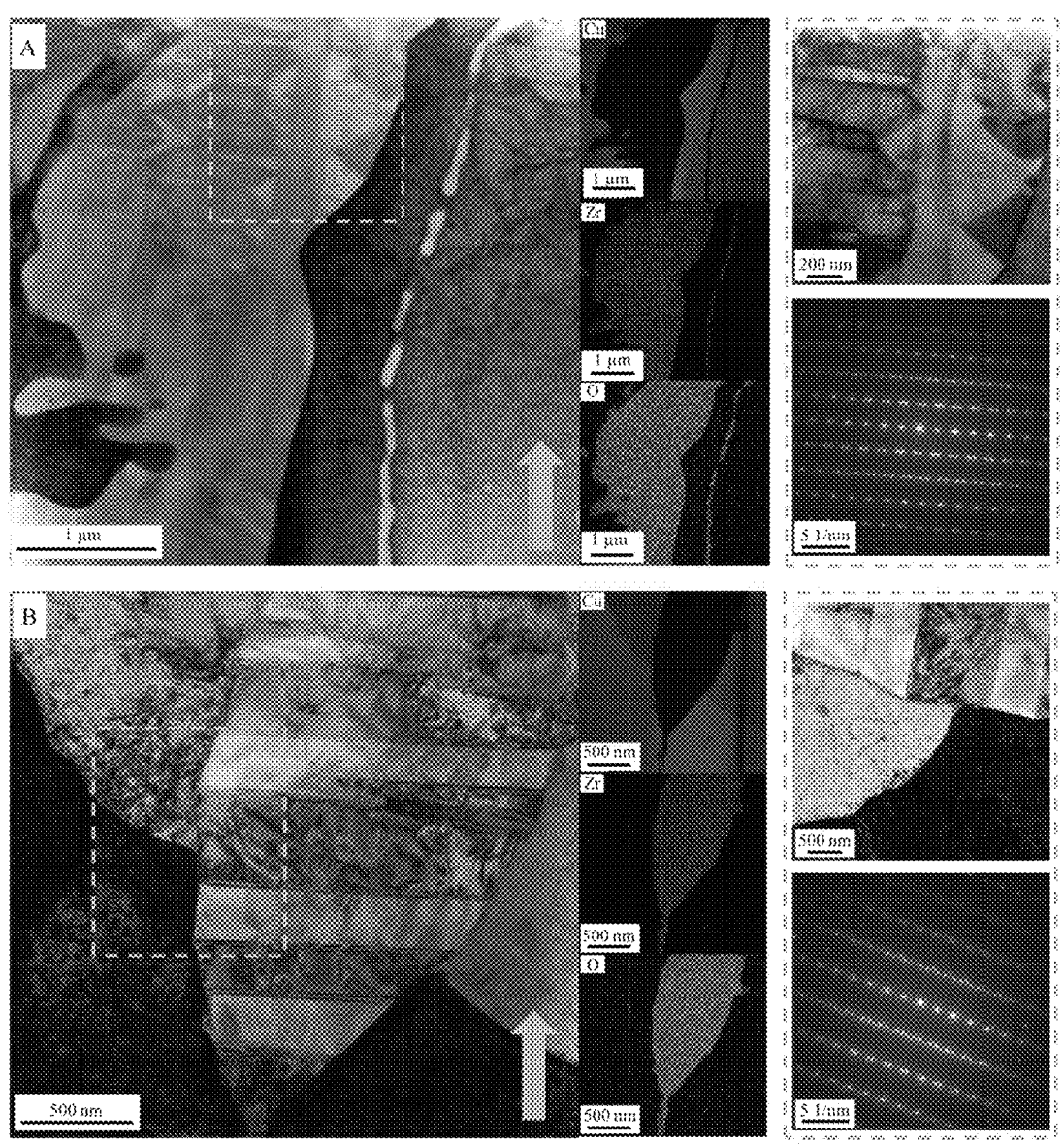
FIG. 12 shows STEM and TEM diffraction images of two focused ion beam lift-outs of representative stringers with energy-dispersive X-ray spectroscopy maps illustrating elemental Cu—Zr—O, along with a higher magnification image of an area with twinning (A) and a stringer demonstrating a fully twinned structure (B)

The TEM images in FIG. 12 provide insight into the stringer morphologies. These contain STEM and TEM images of an FIB lift-out across a stringer with the build direction represented by the grey arrows. These images confirm the stringer as predominantly Zr—O as determined by the EDS maps in both figures. Additionally, the stringer cross-section appears to be a solidified body with a solid cross-section, twinned microstructural features, and no perceivable agglomerated nano-size oxides that make up its body. In welding and additive manufacturing of oxide dispersion strengthened materials, the dispersed nano-oxides originally existing in the powder tend to 'slag off' (i.e., coalesce and reject upwards from the melt pool) and form coarse dispersoids and shapes similar to stringers where the lighter density oxides agglomerate along the solidification front of the cooling melt pool(s). Little is known about the agglomerating oxide effects in additive manufacturing of oxide dispersion strengthened Cu. It appears that the stringer structure in FIG. 12 has morphologies that resemble a ribbon. Considering its depth into the sample surface and contorting shapes observed on the SEM and TEM cross-section images, it is suggested that the structure must have been liquid or semi-liquid at some point during sample fabrication.

Figure 13:
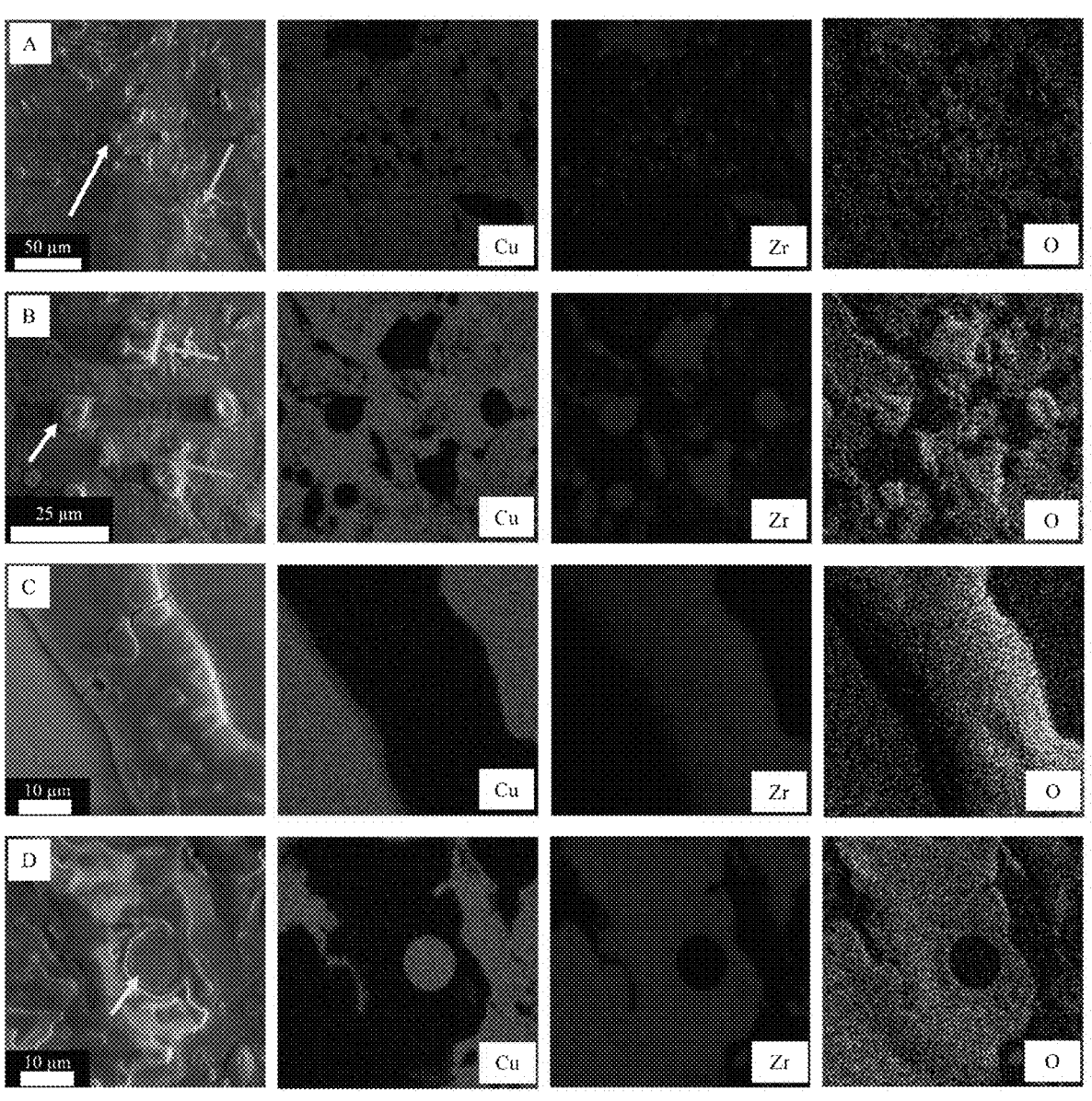
FIG. 13 provides SEM images of observed $ZrO_2$ morphologies on the top surface of a representative fabricated sample demonstrating mixed morphologies (A), spheroids (B), and films (C-D)

To further explore the formation mechanism of these stringer-shaped oxides, a series of images, including SEM, FIB lift-outs, and TEM of the fabricated solid top surface (last build layer to solidify) were observed. This methodology also provides an understanding of the condition of oxides or related structures within a solidified melt pool without subsequent re-melting. FIG. 13 shows SEM images and EDS maps of zirconium oxides and other commonly observed structures, submicron to 100 microns in size, covering the top surface of the fabricated samples. FIG. 13(A) clearly demonstrates a mix of top surface oxide morphologies identified as spheroids, collapsing spheroids, and films. The film morphologies (identified by the green arrows, which are the right arrow in the electron image map of (A) and the top arrow in the electron image map of (B)) are observed with apparent random morphologies while the spheroids (identified by the white arrows, which are the left arrow in (A) and the bottom left arrow in (B)) largely maintain a more symmetrical shape with other non-symmetrical oxides mixed within the field of view. A higher magnification view of the spheroids in FIG. 13B reveals a subset of mixed morphologies among the spheroids. Also, the spheroids are observed in various states of collapse: as nearly spherical ellipsoids (white arrows, i.e., left arrow in (A) and bottom left arrow in (B)), onset of collapse where a film has started to form between the copper surface and the spheroid body (blue arrow, which is the bottom right arrow in (B)), and where the spheroid has nearly collapsed into a film (green arrows, the right arrow in the electron image map of (A) and the top arrow in the electron image map of (B)).

FIGS. 13(C)-(D) show common zirconia film morphologies observed on the top surface. These films contained a mix of thicknesses ranging from the partially wetted structure shown in FIG. 13(C) to nearly flat films with more complete wetting as shown in FIG. 13(D), including stress-related features such as the zirconia depleted spherical region shown by the arrow in FIG. 13(D). Many of the films and spheroids also featured cracks as depicted in FIG. 13(C).

Figure 14:
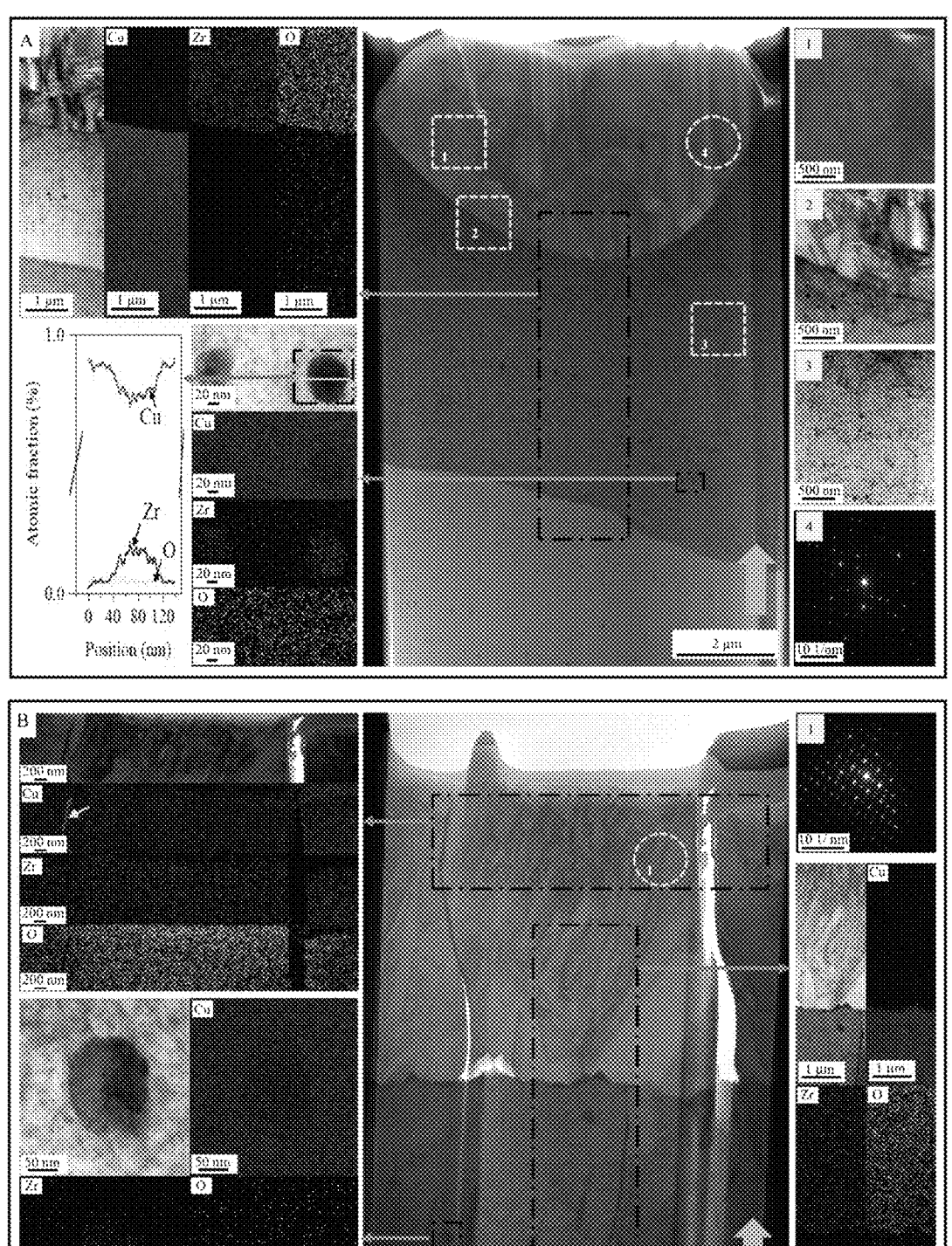
FIG. 14 shows STEM and selected area electron diffraction patterns of observed $ZrO_2$ morphologies on the top surface of a representative fabricated sample demonstrating mixed morphologies: spheroids (A) and films (B), with the center arrows denoting the build direction.

FIGS. 14(A)-(B) are STEM and TEM results of the FIB lift outs from representative top surface films and spheroids, along the build direction, respectively. The FIB lift outs were extracted completely through the oxides and a few microns into the copper blocks in an attempt to rationalize the series of events associated with oxide formation within a solidifying copper melt pool that results in the observed stringer morphologies. FIG. 14A shows the STEM results from a number of features within a spheroid and approximately 10 microns into the solid copper. The low magnification image in the central portion of the figure acts as a datum for specimen characterization. The left inset images in FIG. 14A focus on the EDS composition, and the right images identify internal features of interest. The black box represents a bright field image and corresponding EDS maps of a center section of the oxide and solid copper demonstrating a very sharp boundary between the copper specimen and the oxide on its surface. Within the body of the copper, small spheres were observed to be rich in zirconium and depleted in copper. The EDS map in the bottom left inset reveals no significant concentration of oxygen as confirmed by the line scan across the particle; rich in Zr and depleted in Cu; indicating that spherulites of nano-size elemental zirconium were frozen in the solidifying copper pool. Features 1 and 2 illustrate the complex twinning in the oxide, typical of monoclinic zirconium and identified by the multiple zirconia planes in the diffraction image (inset 4). Inset 2 confirms the very sharp oxide to copper boundary where no clear Moiré fringing was observed due to the mismatch between the monoclinic oxide unit cell and FCC copper. The bottoms of insets 2 and 3 further reveal the nano-spheres within the copper body at the oxide to solid interface and 2 μm within the copper, respectively.

Figure 15:
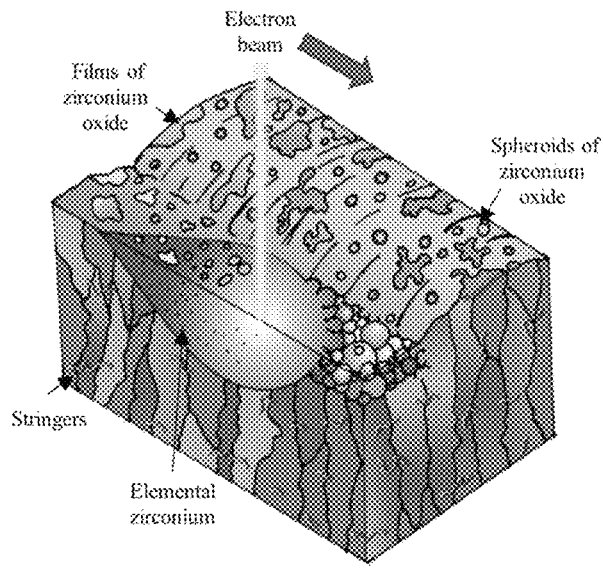
FIG. 15 is a schematic depiction of the timeline of events leading to the formation of the zirconium oxide stringer morphologies.

The film lift-out in FIG. 14(B) shows many similarities with the spheroid in FIG. 14(A), including complex zirconia twinning and nano-size Zr-rich spheroids present in the copper body. Unique features observed in this microstructure were the elongated Zr-rich strings observed within the copper body (white arrow, which is the arrow in the bottom right of FIG. 14(B)) and a less sharp interface between the zirconia film and copper than the spheroid, most likely due to incomplete wetting. A particularly interesting feature is the oxide crack observed in FIG. 14(B) top left inset. During solidification, the zirconium oxide undergoes an allotropic phase transformation forming these occasional cracks. The melt pool then wicks a small amount of liquid copper into the newly formed crack, as shown by the arrow in the top left of the associated EDS maps. Nano-capillary action is known in nanofluidic research, and it points to the timeline of events shown in FIG. 15.

The zirconium is released from the prior particle grain boundaries in the melt pool and some portions make it to the top of the hot and turbulent pool to form spheroids and/or films while some portion of the Zr-rich fluid freezes in the melt pool. As the discontinuous monoclinic zirconia films are incorporated into the AM body during subsequent layers, it most likely remains solid or mushy and becomes contorted in the superheated and turbulent melt pool, forming apparent micron size stringers observed in the XZ cross-sectional images.

3. Property Characteristics of the Fabricated Solids

Figure 16:
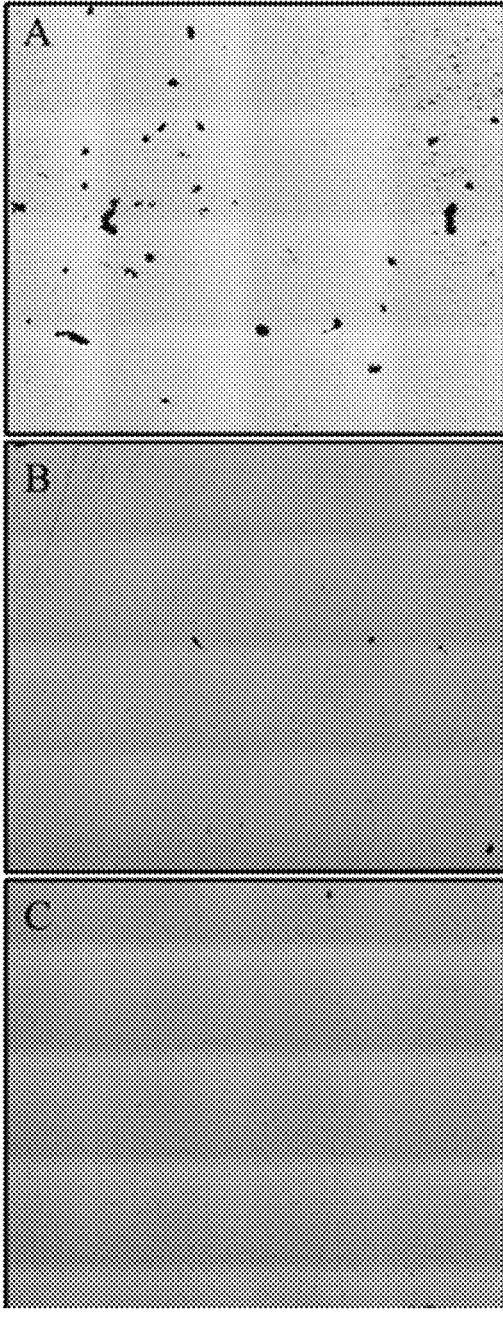
FIG. 16 is an un-etched, tiled micrograph of the cubes fabricated with 6 mA and SF20, 9 mA and SF25, and 12 mA and SF30 (A, B, C, respectively)

FIG. 16 shows representative un-etched tiled micrographs of the as-received samples fabricated with 6 mA (A), 9 mA (B), 12 mA (C) current and 20, 25, 30 speed function (SF), respectively, used to obtain the optical relative density of the solid specimens. It is observed that while the 9 mA and 12 mA specimens illustrate very few porosities, the sample fabricated with 6 mA current presents with several internal porosities, indicating a narrow processing space for this alloy, similar to pure copper for dense sample fabrication.

Figure 17:
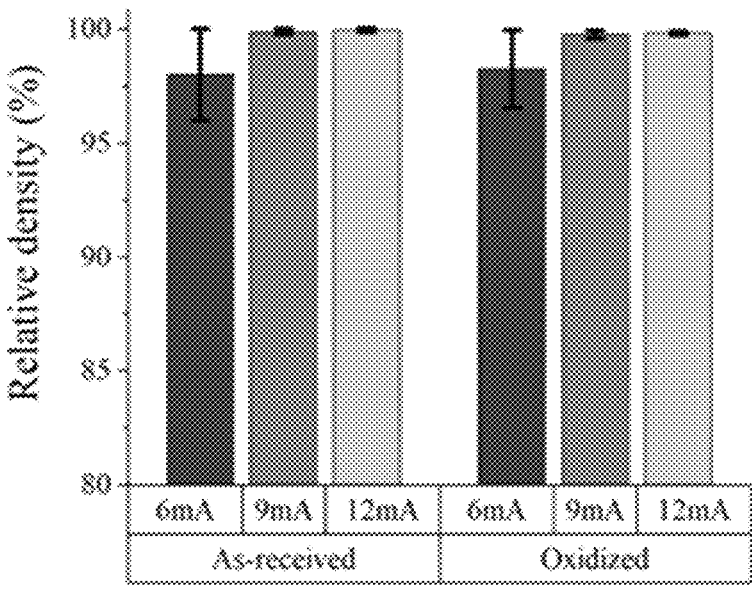
FIG. 17 is a graph of the relative densities (D) of all cubes fabricated with different beam power and speed functions as used in FIG. 16, with the error bars representing a 95% confidence level.

FIG. 17 shows the relative densities of the samples produced from the as-received and oxidized copper powders; in general, the processing space corresponded to the previously established EB-PBF parameters for pure copper with all of the samples exceeding 97% relative density for a beam current of 6 mA, while for the beam currents of 9 mA and 12 mA the relative density exceeded 99.5%.

Figure 18:
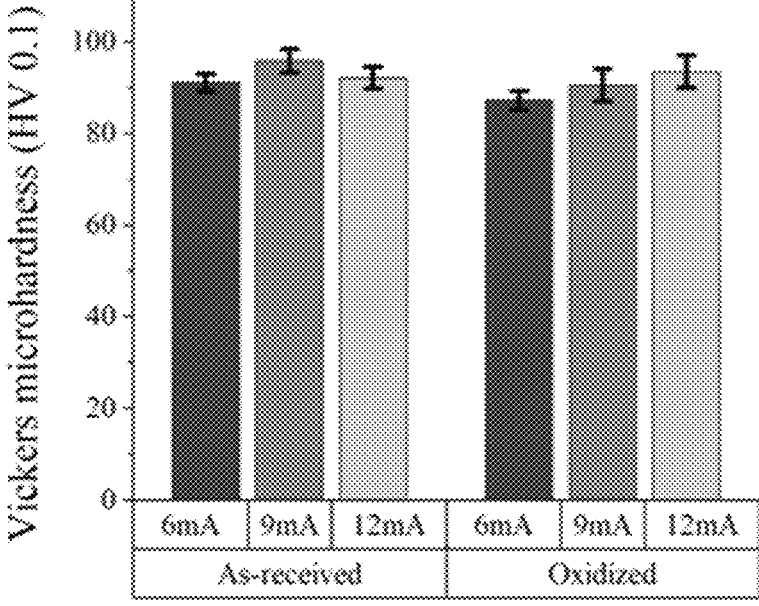
FIG. 18 is a graph of the Vickers microhardness (E) of all cubes fabricated with different beam power and speed functions as used in FIG. 16, with the error bars representing a 95% confidence level.

The Vickers microhardness for the three different process parameters used in this study in the as-received and oxidized samples can be seen in FIG. 18, averaging between 85 to 95 HV0.1. Overall, it is seen that the as-received and oxidized samples showed similar density and microhardness values for all process parameters used on this study.

Table 4 reports the measured physical and mechanical properties of the copper alloy specimens in as-received and oxidized conditions fabricated with the process parameters that produced the highest density. The ultimate tensile strength (UTS) and yield strength (YS) are 260±9 MPa and 150±3 Mpa, respectively, for the as-received, and 241±6 MPa and 146±12 MPa for the oxidized specimens, respectively, which is marginally higher than the reported UTS values of pure Cu with comparable relative densities and oxygen content. The elongation to failure is 34±3.8% for as-received and 43.3±7.5% for the oxidized condition, respectively, noting that all of the tensile specimens in this study were produced horizontally (XY) due to the limited quantity of available feedstock powder. The average electrical conductivity of these specimens is measured at 95.1% IACS for the as-received specimens and at 95.5% IACS for the oxidized specimens. This is in agreement with the expected values based on the alloy content. This alloy is primarily intended to leverage surface oxides on the copper powder to form stable zirconium oxides during the additive manufacturing process, thus increasing the useful life of the copper alloy powder. While an increase in mechanical strength was not the primary goal, the formation of the stringers shown in FIG. 11 achieved a slightly higher strength than pure copper and a high electrical conductivity in the as-received and oxidized condition.

TABLE 4

Table showing the average measured physical properties of the Cu—0.3Zr—0.15Ag wt.
% alloy produced herein by EB-PBF. Values for tested wrought oxygen free electronic grade
(OFE) annealed copper and reported AM pure copper are presented as a baseline reference.

| Material | Relative Density (%) | Electrical conductivity (% IACS) | UTS (MPa) | Yield strength (MPa) | Elongation (%) |
|---|---|---|---|---|---|
| Wrought OFE annealed copper | 100 | 101 | 231 ± 11 | 147 ± 8 | 40.9 ± 1.4 |
| Cu—0.28Zr—0.14Ag (As Received) | 99.98 ± 0.1 | 95.1 ± 1.0 | 260 ± 9.40 | 150 ± 3.11 | 34 ± 3.78 |
| Cu—0.28Zr—0.14Ag (Oxidized) | 99.4 ± 0.1 | 95.5 ± 0.40 | 241 ± 5.7 | 146 ± 12.25 | 43.3 ± 7.47 |
| As-fabricated AM pure copper | 99.4 ± 0.01 | — | 211 ± 14.7 | 101.4 ± 27.9 | 27.9 ± 5.5 |

Summary of Findings

The fabricated solid specimens demonstrated relative densities above 99% when processed with higher input power (9 mA and 12 mA current), and above 97% when processed with lower input power (6 mA current). All specimens showed columnar microstructure along the build direction, in accord with commonly reported microstructure in powder bed fusion additive manufacturing of copper.

The SEM and EDS maps of the microstructure revealed the presence of $ZrO_2$ with different morphologies across melt pools and grain boundaries in the fabricated solid samples. These stringers are characterized as monoclinic $ZrO_2$ from the XRD, with a twinned structure as observed in the TEM images.

The top surface SEMs and STEM images suggest that these stringers are formed during the solidification process as Zr gets released from the powder grain boundaries and scavenges the available oxygen present in the system to form more energetically favorable $ZrO_2$. However, elemental zirconium appears sporadically in the TEM images within the copper matrix, although at a significantly lower scale lengths. As a layer gets re-melted in subsequent scans, these $ZrO_2$ structures get pushed down and incorporated into the solid microstructure as stringers, as seen in the SEM images.

An average electrical conductivity of >95% was measured on the dense samples fabricated from both as-received and oxidized powder conditions. For the mechanical properties, UTS of 260±9.40 MPa and 241±5.7 MPa, yield of 150±3.11 MPa and 146±12.25 MPa, and elongation of 34±3.78% and 43.3±7.47% were obtained from the tensile samples fabricated with as-received and oxidized powder, respectively. As expected, Zr formed an incoherent $ZrO_2$ phase with insignificant influence on the electrical conductivity when compared with the reported conductivity values of EB-PBF fabricated pure copper.

We claim:

1. A copper alloy comprising:
   about 0.26% by weight to about 0.34% by weight Zr; and
   about 0.11% by weight to about 0.19% by weight Ag, with the balance being Cu and optionally incidental impurities, wherein, when present, said incidental impurities are present in an amount of 0.001% by weight or lower, said % by weight being based upon the weight of said copper alloy, said alloy having at least one of:
   (i) an ultimate tensile strength of about 230 MPa to about 250 MPa; or
   (ii) a yield strength of about 130 MPa to about 159 MPa; and
   said alloy having an electrical conductivity of at least 94% IACS.

2. The copper alloy of claim 1, wherein said alloy comprises about 99.47% by weight to about 99.63% by weight Cu.

3. The copper alloy of claim 1, wherein said alloy consists of said Cu, said Zr, said Ag, and optionally said incidental impurities in an amount of 0.001% by weight or lower, when present in said alloy.

4. The copper alloy of claim 1, wherein said alloy has a % elongation of about 25% or more.

5. The copper alloy of claim 1, said alloy comprising about 0.28% to about 0.30% by weight Zr and about 0.14% to about 0.15% by weight Ag, with the balance being Cu and optionally incidental impurities.

6. The copper alloy of claim 1, said alloy having an electrical conductivity of at least 95% IACS.

7. A copper alloy comprising:
   about 0.26% by weight to about 0.34% by weight Zr; and
   about 0.11% by weight to about 0.19% by weight Ag, with the balance being Cu and optionally incidental impurities, wherein, when present, said incidental impurities are present in an amount of 0.001% by weight or lower, said % by weight being based upon the weight of the copper alloy, said alloy having a % elongation of about 25% or more, said alloy having an ultimate tensile strength of about 230 MPa to about 250 MPa and an electrical conductivity of at least 94% IACS.

8. The copper alloy of claim 7, said alloy comprising about 0.28% to about 0.30% by weight Zr and about 0.14% to about 0.15% by weight Ag, with the balance being Cu and optionally incidental impurities.

9. The copper alloy of claim 7, said alloy having an electrical conductivity of at least 95% IACS.

* * * * *